United States Patent
McElvain

(10) Patent No.: US 7,382,494 B2
(45) Date of Patent: Jun. 3, 2008

(54) METHOD FOR TAG PLANE GROWTH AND CONTRACTION FOR IMPROVING OBJECT EDGE RENDERING

(75) Inventor: Jon S. McElvain, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 962 days.

(21) Appl. No.: 10/608,802

(22) Filed: Jun. 27, 2003

(65) Prior Publication Data

US 2004/0263909 A1 Dec. 30, 2004

(51) Int. Cl.
*G06K 15/02* (2006.01)
*H04N 1/409* (2006.01)
*H04N 1/40* (2006.01)

(52) U.S. Cl. .......... 358/2.1; 358/3.27; 358/1.9; 358/1.15; 382/266; 382/257

(58) Field of Classification Search .......... None
See application file for complete search history.

(56) References Cited

U.S. PATENT DOCUMENTS

| | | | | |
|---|---|---|---|---|
| 4,115,815 A | * | 9/1978 | Nakagome et al. | 358/426.09 |
| 4,942,541 A | * | 7/1990 | Hoel et al. | 358/1.16 |
| 5,137,362 A | * | 8/1992 | LeBeau | 382/145 |
| 5,644,366 A | * | 7/1997 | Ushida et al. | 348/625 |
| 5,687,303 A | * | 11/1997 | Motamed et al. | 358/1.18 |
| 6,006,013 A | * | 12/1999 | Rumph et al. | 358/1.15 |
| 6,069,709 A | * | 5/2000 | Harrington | 358/1.8 |
| 6,236,754 B1 | * | 5/2001 | Harrington | 382/199 |
| 6,256,104 B1 | * | 7/2001 | Rumph et al. | 358/1.15 |
| 6,327,043 B1 | * | 12/2001 | Rumph et al. | 358/1.15 |
| 6,400,467 B1 | * | 6/2002 | Harrington | 358/1.9 |
| 6,411,733 B1 | * | 6/2002 | Saund | 382/190 |
| 6,834,124 B1 | * | 12/2004 | Lin et al. | 382/261 |
| 6,894,702 B2 | * | 5/2005 | Stamm et al. | 345/613 |

OTHER PUBLICATIONS

Xerox, filed Jun. 27, 2003, Jon S. McElvain.*

* cited by examiner

*Primary Examiner*—Twyler L. Haskins
*Assistant Examiner*—Pawandeep S Dhingra
(74) *Attorney, Agent, or Firm*—Jeannette Walder

(57) ABSTRACT

A method of improving edge rendering of objects includes dilation (or contraction) of an object's tag plane by one or more pixels into the surrounding region, with the adjacent tag region having a corresponding contraction (or dilation). The objects of interest (e.g., white text) are first identified; the corresponding object tag plane is then spread or choked, in a fashion analogous to trapping. In the case of negative text on a tint background, by expanding the tag plane for the negative text object, the text hint would be forced one pixel into the tint object plane everywhere along the perimeter of the negative text. This could then enable greatly improved negative text rendering.

8 Claims, 5 Drawing Sheets

FIG. 6A
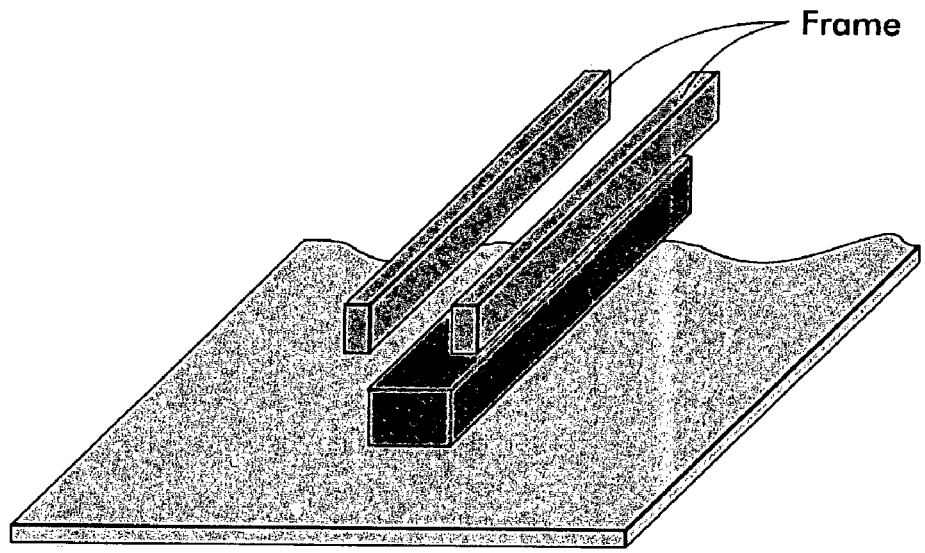
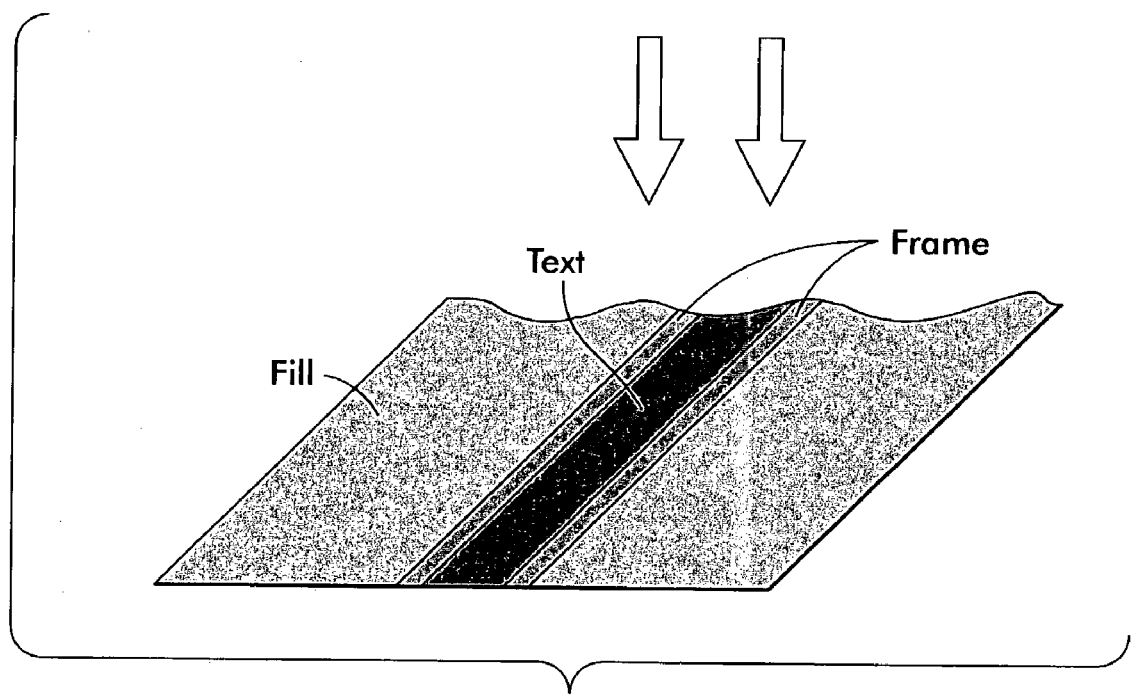
FIG. 6B

METHOD FOR TAG PLANE GROWTH AND CONTRACTION FOR IMPROVING OBJECT EDGE RENDERING

CROSS REFERENCE TO RELATED APPLICATIONS

This invention is related to the inventor's application for "Method for Tag Growth Using Run Length Encoded Data", which has been assigned to the assignee of this invention, application Ser. No. 10/607,688, which has been filed Jun. 27, 2003 the same date as this application, and which is incorporated herein by reference.

FIELD OF THE INVENTION

This invention relates generally to methods for improving object rendering using tags and hints, and more particularly, to a method for varying the size of an object tag plane in order to improve edge rendering of its corresponding object.

BACKGROUND OF THE INVENTION

Quite common among digital front ends (DFEs) is the ability to identify object types (text, image, strokes, fill, line art, etc.) embedded in a given page description language (PDL) master. These object types can then be used to optimize the processing of the contone data prior to transmission to the print engine. For some engines, it is possible to supply rendering "hints" or "tags" for each pixel, allowing the engine to optimally render the objects on the page, pixel by pixel. For example, for some printers, the tags are simply halftone screen specifications, and the DFE has complete control over the way each pixel is rendered. Other engines also have the capability to accept tags or hints to optimize rendering, and these are generally assigned based on the object type. For these engines, a tag or hint tells the rendering engine which rendering conditions to use for a particular object. These tags or hints are generally specified for the entire object. Positive tinted text on white, in the case of some printers, is assigned the "text" hint. For some printing systems, for example the Xerox iGen3, the text hint may instruct the engine rendering module to place high-resolution-outline cells at the perimeter of the object (while rendering the body of the text with the default halftone); this technique will generally improve the sharpness of the text. Similarly, negative (white) text on a tinted background may receive the "text" hint, and the background may receive the "fill" hint. For some printers, such as iGen3, outlining is explicitly disabled for the "fill" hint. Since all of the pixels that would be converted to outline cells reside on the "fill" portion of the white text/fill boundary, no outlining would therefore be realized for negative text. This presents a serious image quality defect for white text objects on tinted fills, as the edges of this negative text may appear ragged. The problem can also exist at the boundaries of two different object types in which a hint for one object explicitly disables rendering that would be pleasing at the boundary of the other object.

SUMMARY OF THE INVENTION

A method of improving edge rendering of objects, according to one aspect of the invention, includes providing a first object which has a portion of a common edge with a second object; wherein the first object has associated with it a first region of a tag plane for defining rendering hints for rendering the first object; wherein the second object has associated with it a second region of the tag plane for defining rendering hints for rendering the second object; specifying a number of pixels located on the portion of the common edge between the first object and the second object to be modified, wherein modification may include increasing or decreasing the number of pixels on one of the first object or the second object; and modifying the first region of the tag plane corresponding to the first object by the specified number of pixels at the boundary of the first and second objects. If the first region of the tag plane is increased by the specified number of pixels at the boundary of the first and second objects, the second region of the tag plane is decreased by the specified number of pixels at the boundary of the first and second objects. Correspondingly, if the second region of the tag plane is increased by the specified number of pixels at the boundary of the first and second objects, the first region of the tag plane is decreased by the specified number of pixels at the boundary of the first and second objects.

A method of improving edge rendering of objects, according to another aspect of the invention, includes providing a first object which has a portion of a common edge with a second object; wherein the first object is specified to be rendered on top of the second object, is represented by abstract object descriptors and has associated with it a first tag plane for defining rendering hints for rendering the first object; wherein the second object is represented by abstract object descriptors and has associated with it a second tag plane for defining rendering hints for rendering the second object; specifying a direction and number of pixels located on the portion of the common edge between the first object and the second object to be modified; creating a new object (or "frame"), wherein the new object is to be rendered on top of the first and second objects, is represented by abstract object descriptors and has associated with it a new tag plane for defining rendering hints for rendering the new object; wherein the new object is defined to be located at the interface between the first and second objects and having a width determined by the specified number of pixels and an inner geometrical boundary and an outer geometrical boundary; if the specified direction is toward the first object, setting the outer geometrical boundary of the new object to be placed at the interface between the first and second object, and setting the tag value for each pixel of the new object to be equal to the tag value of the second object at each perimeter pixel location; and if the specified direction is away from the first object, setting the inner geometrical boundary of the new object to be placed at the interface between the first and second objects, and setting the tag value for each pixel of the new to be equal to the tag value of the first object at each perimeter pixel location. If the specified direction is toward the first object, setting the contone value of each pixel of the new object to be equal to the contone value of the corresponding pixel of the first object; and if the specified direction is away from the first object, setting the contone value of each pixel of the new object to be equal to the contone value of the corresponding pixel of the second object.

The method may be applied to white objects on non-white objects. The white object may be of any type, such as a text object, a line art object, etc. The non-white (or tint) object may be of any type, such as a fill object and a stroke object. Both objects may be text objects, for example, such as when a text object is placed over a shadow text object. The method of improving edge rendering of objects, especially white objects on non-white objects, overcomes the problems of the prior art by varying the size of the object in the tag plane in order to improve edge rendering of its corresponding object. The boundary of the contone plane of the two objects remains the same; however, the boundary of the tag plane corresponding to the interface between the two objects is modified in order to better render this interface. Thus in the case of the white object on a tint fill object, by expanding the region of the tag plane associated with the white object, the edge pixels at the negative text/fill interfaces can be rendered in a fashion consistent with positive text on a white background.

The method involves expansion (or contraction) of object tag regions by one or more pixels into the surrounding region, with the surrounding tag regions having a corresponding contraction (or expansion). The objects of interest (e.g., white text) are first identified; the corresponding object tag region is then spread or choked, in a fashion analogous to trapping. This tag plane spread or choke operation can be performed in object space prior to rasterizing, or after the object data are converted to a run-length encoded format, or even in the fully rasterized form. In the case of the negative text on a tint background, by dilating the tag plane for the negative text object, the "text" hint would be forced at least one pixel into the tint object plane everywhere along the perimeter of the negative text. For the Xerox iGen3 system, this would then enable outlining around the perimeter of the text/fill interface, providing greatly improved negative text rendering.

A compound object for transmission to a print engine, according to another aspect of the invention, includes a first object and a second object, wherein the first object has a portion of a common edge with a second object; a tag plane for defining rendering hints for rendering the compound object; wherein the first object has associated with it a first region of the tag plane for defining rendering hints for rendering the first object; wherein the second object has associated with it a second region of the tag plane for defining rendering hints for rendering the second object; a modification region located at the portion of the common edge, wherein the modification region includes a specified number of pixels located on the portion of the common edge between the first object and the second object; and wherein the modification region increases one of the first region and the second region of the tag plane by the specified number of pixels at the boundary of the first and second objects and correspondingly decreases the other of the first region and the second region of the tag plane by the specified number of pixels at the boundary of the first and second objects.

A compound object for transmission to a print engine, according to yet another aspect of the invention, includes a first object and a second object, wherein the first object has a portion of a common edge with a second object; wherein the first object is specified to be rendered on top of the second object, is represented by abstract object descriptors and has associated with it a first tag plane for defining rendering hints for rendering the first object; wherein the second object is represented by abstract object descriptors and has associated with it a second tag plane for defining rendering hints for rendering the second object; a frame object, wherein the frame object is to be rendered on top of the first and second objects, is represented by abstract object descriptors and has associated with it a new tag plane for defining rendering hints for rendering the new object; wherein the frame object is located at the interface between the first and second objects, has a width determined by a specified number of pixels, an inner geometrical boundary and an outer geometrical boundary; wherein, if a specified direction is toward the first object, the outer geometrical boundary of the frame object is located at the interface between the first and second objects, and the tag value for each pixel of the frame object is the tag value of the second object at each perimeter pixel location; and wherein, if the specified direction is away from the first object, the inner geometrical boundary of the new object is located at the interface between the first and second objects, and the tag value for each pixel of the frame object is the tag value of the first object at each perimeter pixel location.

BRIEF DESCRIPTION OF THE DRAWINGS

FIGS. 6A-6B illustrates a process of flattening, where overlapping objects are rasterized.

DETAILED DESCRIPTION OF THE PREFERRED EMBODIMENTS

Figure 1:
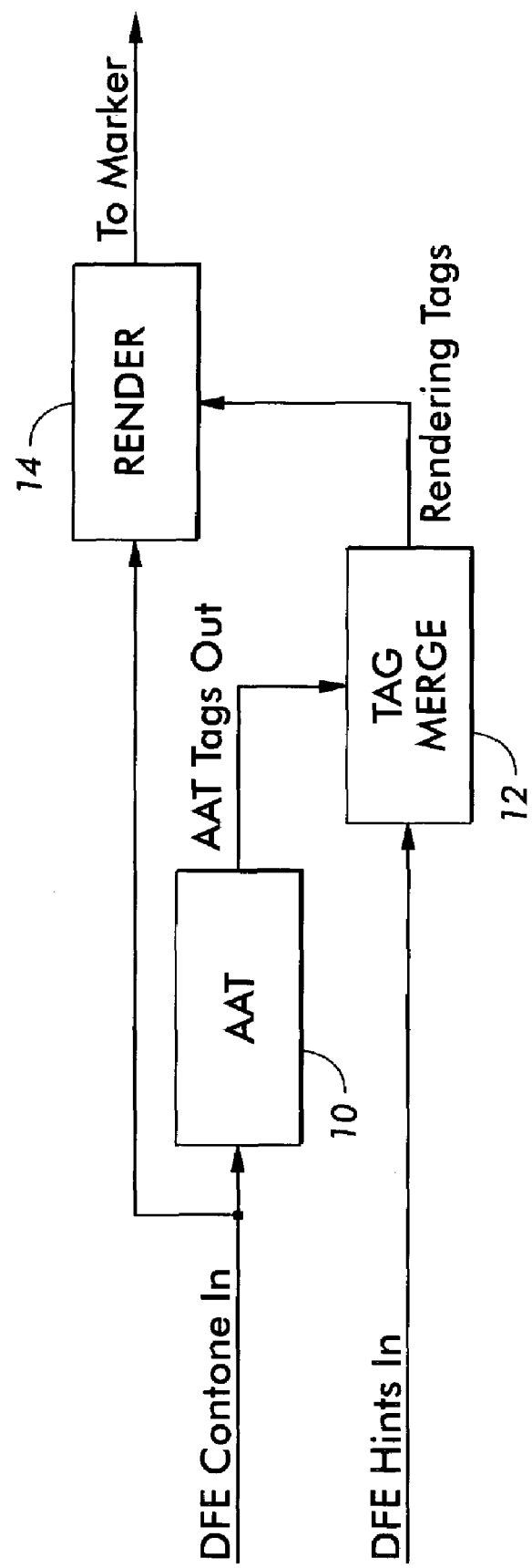
FIG. 1 is a block diagram of a contone rendering module 1.

The term "data" refers generally to physical signals that indicate or include information. An "image", i.e., a pattern of physical light, may include "image objects" in the form of characters, words, and text as well as other features such as line art, graphics, or graphical structures. An image may be divided into "segments," each of which is itself an image. A segment of an image may be of any size up to and including the whole image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. Although described herein as being particularly applicable to continuous-tone processing, the present invention applies equally as well to the processing of color images, wherein each separation is treated, effectively, as a gray-scale or continuous-tone image. Accordingly, references herein to the processing of continuous-tone (contone) or gray-scale images is intended to include the processing of color image separations as well. An operation typically performs "image processing" when it operates on an item of data that relates to part of an image.

The term "tag" or "hint" refers to complimentary data to be used in conjunction with the digital contone data to optimally render each pixel of a digital image. Each pixel of the contone plane is assumed to have a corresponding pixel in the tag plane.

An "image input device" is a device that can receive an image and provide an item of data defining a version of the image. A "scanner" is an image input device that receives an image by a scanning operation, such as by scanning a document. An "image output device" is a device that can receive an item of data defining an image and provide or render the image as output. A "display" is an image output device that provides the output image in human viewable form. "Halftoning" refers generally to rendering the digital image to a bit map form that can be used to drive the imaging device and includes a process that prepares the pixels for driving the imaging devices. For printing devices; the halftone image that is created is usually in a form such binary pixels, high addressability pixels, pulse width modulation codes, or some reduced quantization form that is compatible with the imaging device in the printer.

"Graphical features," "line art objects," and "text" typically refer to computer-generated features in an image as opposed to pictorial or natural scene content. The terms may also be used to describe computer-generated features that have been printed and re-digitized with a device such as an input scanner. The term "dilation" refers to expanding or extending the boundary of a region within a contone plane or a tag plane. The term "contraction" refers reducing or shrinking the boundary of a region within a contone or tag map. Dilation and contraction of the contone or tag plane may be performed independently.

The term new object or "frame" refers to an object or collection of objects that trace the border of the interface between two other objects. The frame width must be at least one pixel, and generally has a separate contone and tag plane. A frame is assumed to always be rendered above the other two objects it is associated with.

As described above, many DFEs have the capability to recognize various object types embedded in PDL masters, for example text, stroke, and fills. These object types can then be used to optimize the processing of the contone data prior to transmission to the print engine. For some engines, for example Xerox Corporation's iGen3 and DC2060, it is also possible to supply rendering "hints" or "tags", for each pixel, allowing the engine to optimally render the objects on the page. For the 2060/6060 systems, the tags are simply halftone screen specifications, and the DFE has complete control over the way each pixel is rendered. For the iGen3, there is an intermediate rendering stage, entitled the Contone Rendering Module (CRM).

A simplified block diagram of the CRM is shown in FIG. 1. For each separation, the DFE provides a contone (8 bits/pixel) data plane and hint (4 bits/pixel) data plane. The contone data is passed through the anti-aliased tagging (AAT) module 10. The data is provided to the tag merge module 12. The AAT performs a pixel by pixel inspection of the contone data, and creates a (4 bit) tag based on the particular geometry, object type or edge characteristics detected (it is here that edge tags are created). These AAT tags are then merged with the DFE hints in the tag merge module 12 on a per-pixel basis, producing the final set of CRM rendering tags to be used for the rendering stage. 14. By virtue of the tag merge module 12, the DFE specified hints can override any outlining that would otherwise be specified by the AAT module.

Figure 2:
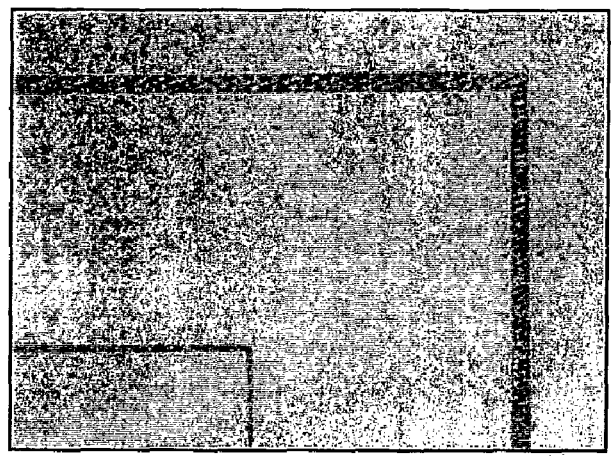
FIG. 2 illustrates outlining around a tinted line art object on a fill object.

For example, for fill objects, outlining is not desirable, and the specification of the DFE "fill" hint will explicitly disable the AAT outline tag; instead the system halftone will be used for rendering. On the other hand, for text and line art objects, the use of outlining has been found to produce superior image quality, so these AAT outline tags are allowed when the DFE "text" hint is specified. An example of such outlining is shown in FIG. 2.

Negative text and line art (or any other negative object) on tinted background (or any other tinted object) presents another problem in the area of rendering. The white objects (e.g., text or line art or other object) will receive the DFE "text" tag, as before, and the background typically will receive the "fill" tag. When the AAT performs its image analysis, it will specify outline cells to be placed at the perimeter of the negative text. However, all of these outline tags will exist inside the fill region, by virtue of the fact that the text is white. Because outlining is explicitly disabled when the "fill" tag is used, the system halftone will be used for rendering these edges, resulting in a ragged text appearance.

The proposed solution to this problem is to "dilate" (or contract) the tag boundaries associated with negative text or line art. The above-described problem can be solved by one pixel growth of the text tag plane outward (and a corresponding one pixel contraction of the fill tag plane), but it is not limited to this in the general case. In fact, this technique is not limited to negative text/line art; it can be applied to all object types, depending on need. The method may be used whenever two different object types share a portion of a common edge boundary and the rendering hint for the second object type conflicts with the rendering hint for the first object type. The operation is analogous to trapping where the contone data of objects are spread or choked to compensate for misregistration errors. The object tag plane growth would then involve a set of "rules" that are to be followed during image processing. The fundamental rules would then be:

1) Identify objects whose tag plane is to be grown or contracted.

2) Specify the amount (number of pixels) by which the tag plane is to be modified at the edges of these objects.

3) Grow or contract the tag plane of the object of interest by the amount specified and contract or grow the tag plane of the adjacent object by the amount specified.

Figure 3:
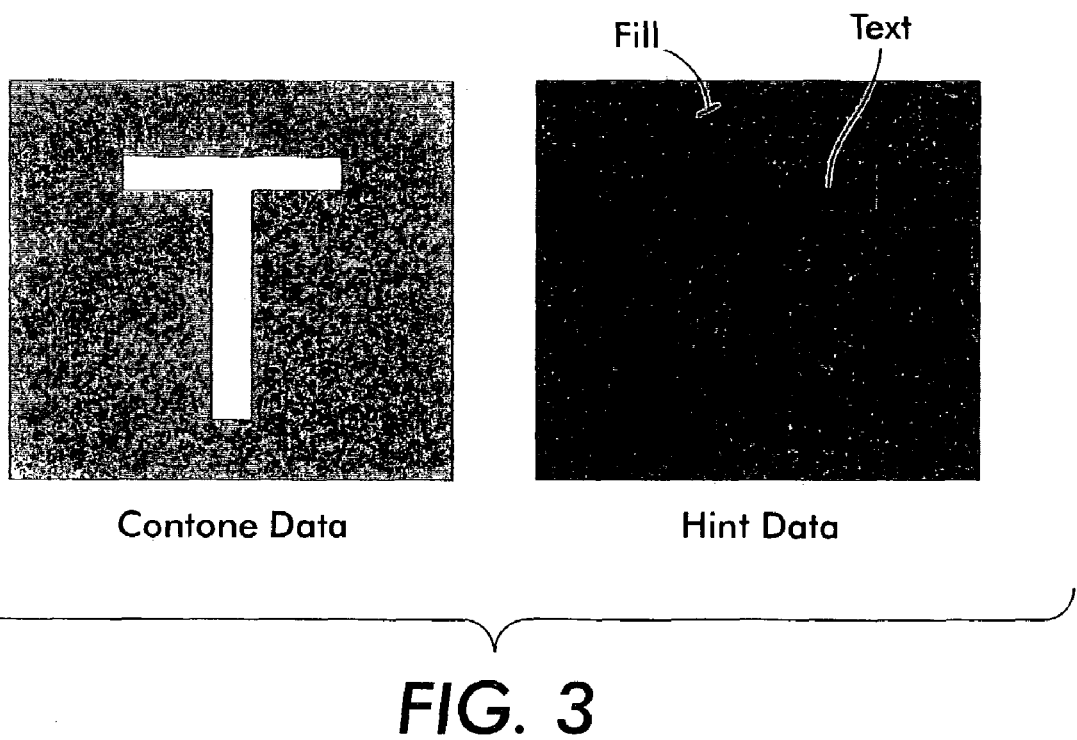
FIG. 3 illustrates contone data for a white text object on a tinted background and its corresponding hint data.

FIG. 3 illustrates the result of tag plane growth for the case of negative text over tint. On the left is the contone representation of negative text on a tint background; on the right are the corresponding tag planes showing the result of tag growth. Note that tag plane for the text hint data has been expanded into the tag plane for the fill data. Correspondingly, the tag plane for the fill data has been contracted. For a printer such as iGen3, this would result in rendering of the negative text edges using the outline AAT cells.

Figure 4:
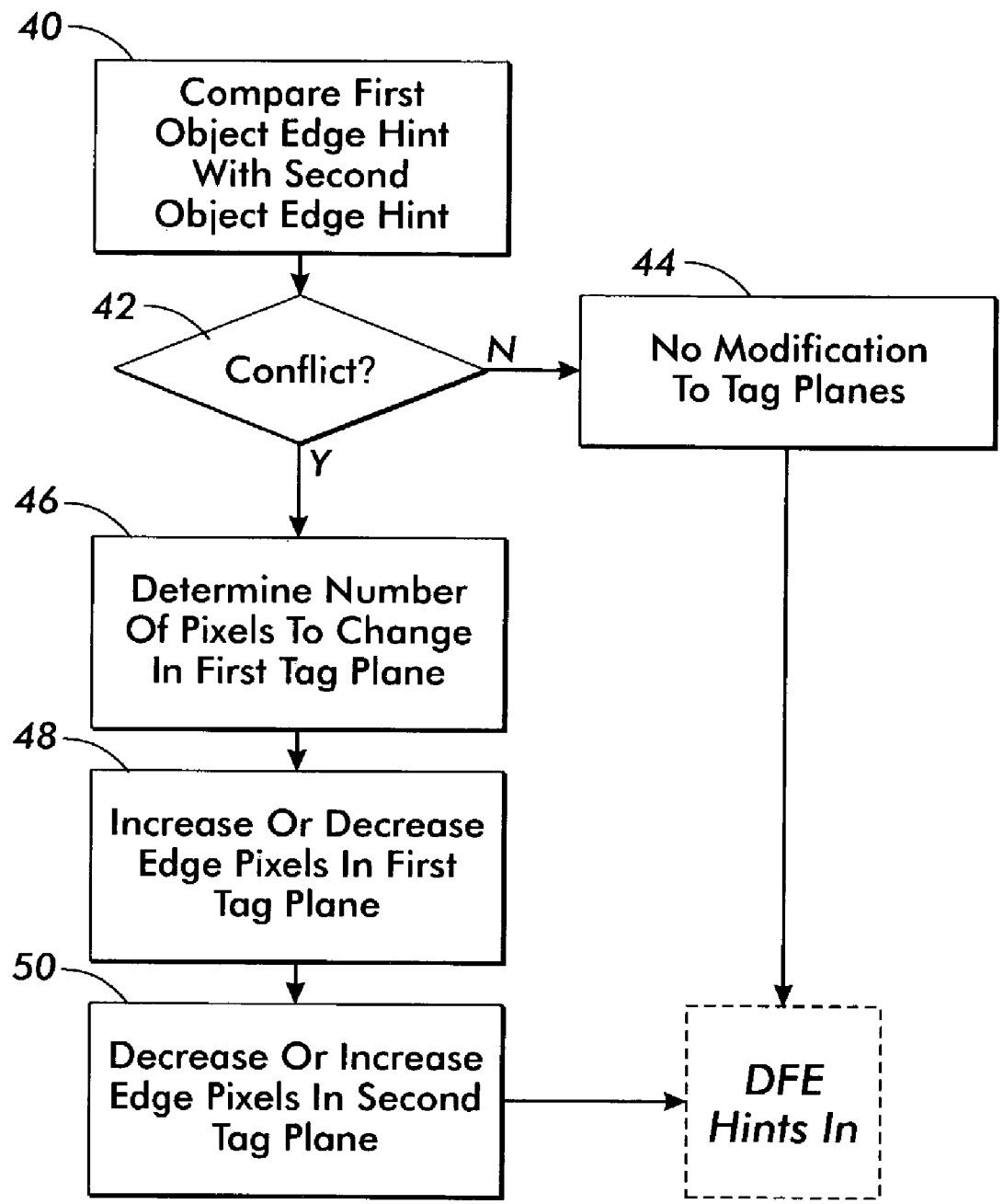
FIG. 4 is a flow diagram of a method of improving edge rendering of objects.

A flow diagram of the method is shown in FIG. 4. Referring to FIG. 4, a first object and a second object have at least a portion of an edge in common. In step 40 the rendering hint to render the edge of the first object is compared with the rendering hint to render the edge of the second object. A conflict is evaluated in step 42. For example, there may be no conflict with the two rendering hints, in which neither tag plane is modified (step 44). In the case of a conflict, in step 46 the number of pixels to be changed at the interface of the two objects in the tag plane is determined. In step 48 the region of the tag, plane corresponding to the perimeter of the first object is modified. If the edge pixels are dilated in the tag plane region corresponding to the first object, in step 50 the edge pixels are contracted in the region of the tag plane corresponding to second object, at the interface between the two objects. If the edge pixels are contracted in the region of the tag map corresponding to the first object, the edge pixels are dilated in the region of the tag map corresponding to the second object, at the interface between the two objects. Note that both dilating and contracting of the tag plane can occur at different points along the edge in order to achieve a smooth edge rendering. The method enables all edge pixels to have the desired rendering hint. Note that the foregoing dilation/contraction and corresponding contraction/dilation of the object tag regions is accomplished on a pixel-by-pixel basis to achieve the-desired edge condition.

Figure 5:
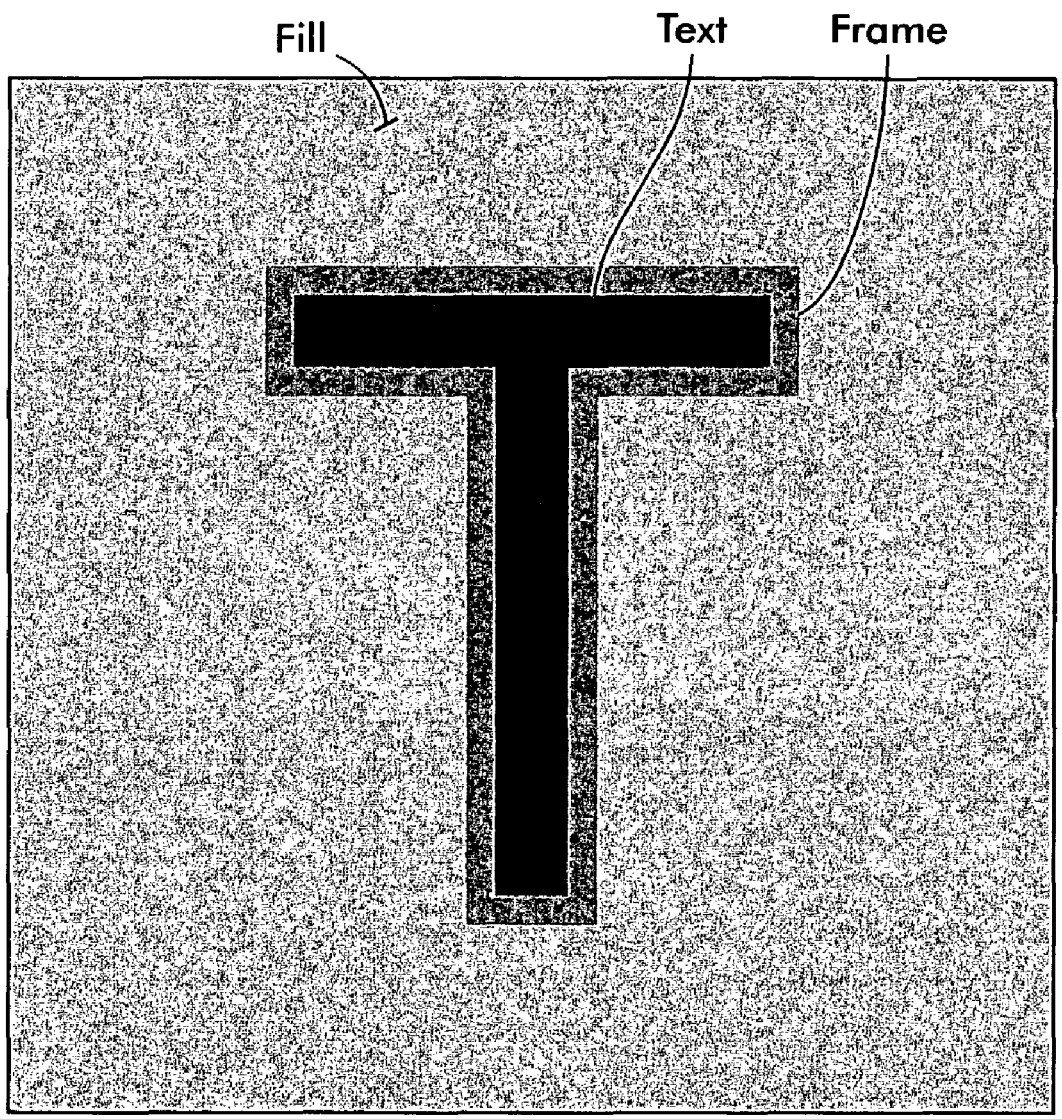
FIG. 5 illustrates creation of a "frame" object.

Implementation of such tag plane dilation/contraction can be performed in object space (prior to flattening or rendering), where page entities are represented by abstract vector descriptors and separate tag planes. In this case, once the object interfaces that require tag modification are identified, a new object (or collection of objects), called a "frame" would be created (FIG. 5), whose geometry would trace the interface between the original abutting objects (the text object and the fill object in FIG. 5), and whose width would be at least one pixel. In the case where dilation of the inner object's tag plane (the text object) is required, the inner boundary of the frame would be set to the text object interface. Furthermore, the contone value of the frame would be set equal to the contone value of the outer object (i.e., the fill object for each pixel where the frame overlaps the fill object), but the tag value would be assigned the tag value at the interface of the inner object (the text object). In the case where contraction of the inner object's tag plane is required, the outer boundary of the frame would be set to the inner (text) object interface. Furthermore, the contone value of the frame would be equal to the contone value of the inner (text) object (for each pixel where the frame overlaps), but the tag value would be assigned the tag value at the interface of the outer object (the fill object). The "frame" object is assumed to be on top of the abutting objects (text object and fill object), so that it will always be imaged following the flattening process (FIGS. 6A and 6B). Note that in FIGS. 6A and 6B, the frame object has been assigned the contone values of the fill object, and the tag values of the text object.

This method can also be performed after conversion to a run length encoded format, where a run-by run analysis can be carried out, and subsequent tag modifications applied. Or it can be performed once rasterization of the tag/contone data occurs, for example in the CRM of the iGen3.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of improving edge rendering of objects at a common edge of two different object types in which a hint for one object disables rendering that would be pleasing at the boundary of the other object, comprising:

providing a first object which has a portion of a common edge with a second object;

wherein the first object has associated with it a first region of a tag plane for defining rendering hints for rendering the first object, wherein each pixel in the first object has a corresponding pixel hint in the first region of the tag plane;

wherein the second object has associated with it a second region of the tag plane for defining rendering hints for rendering the second object, wherein each pixel in the second object has a corresponding pixel hint in second region of the tag plane;

specifying a number of pixels located on the portion of the common edge between the first object and the second object to be modified, wherein modification may include increasing or decreasing the number of pixels on one of the first object or the second object; and modifying the first region of the tag plane corresponding to the first object by the specified number of pixels at the boundary of the first and second objects without modifying the corresponding pixels in the first object, wherein the specified number of pixel hints in the first region of the tag plane are modified without modifying the corresponding pixels in the first object.

2. The method of claim 1, wherein the first object comprises a white object and wherein the second object comprises a non-white object.

3. The method of claim 2, wherein the white object is at least one of a text object, or stroke object and the non-white object is at least one of a fill object and an image or sweep object.

4. The method of claim 1, wherein the first region of the tag plane is increased by the specified number of pixels at the boundary of the first and second objects and the second region of the tag plane is decreased by the specified number of pixels at the boundary of the first and second objects.

5. The method of claim 1, wherein the second region of the tag plane is increased by the specified number of pixels at the boundary of the first and second objects and the first region of the tag plane is decreased by the specified number of pixels at the boundary of the first and second objects.

6. The method of claim 1, wherein the number of pixels to modify the first region of the tag plane is one pixel.

7. The method of claim 1, wherein the number of pixels to modify the first region of the tag plane is two pixels.

8. The method of claim 1, wherein the number of pixels to modify the first region of the tag plane is three pixels.

* * * * *